E. H. HAHN.
MOTOR CYCLE STARTER.
APPLICATION FILED NOV. 3, 1916.
1,272,947.
Patented July 16, 1918.
2 SHEETS—SHEET 1.
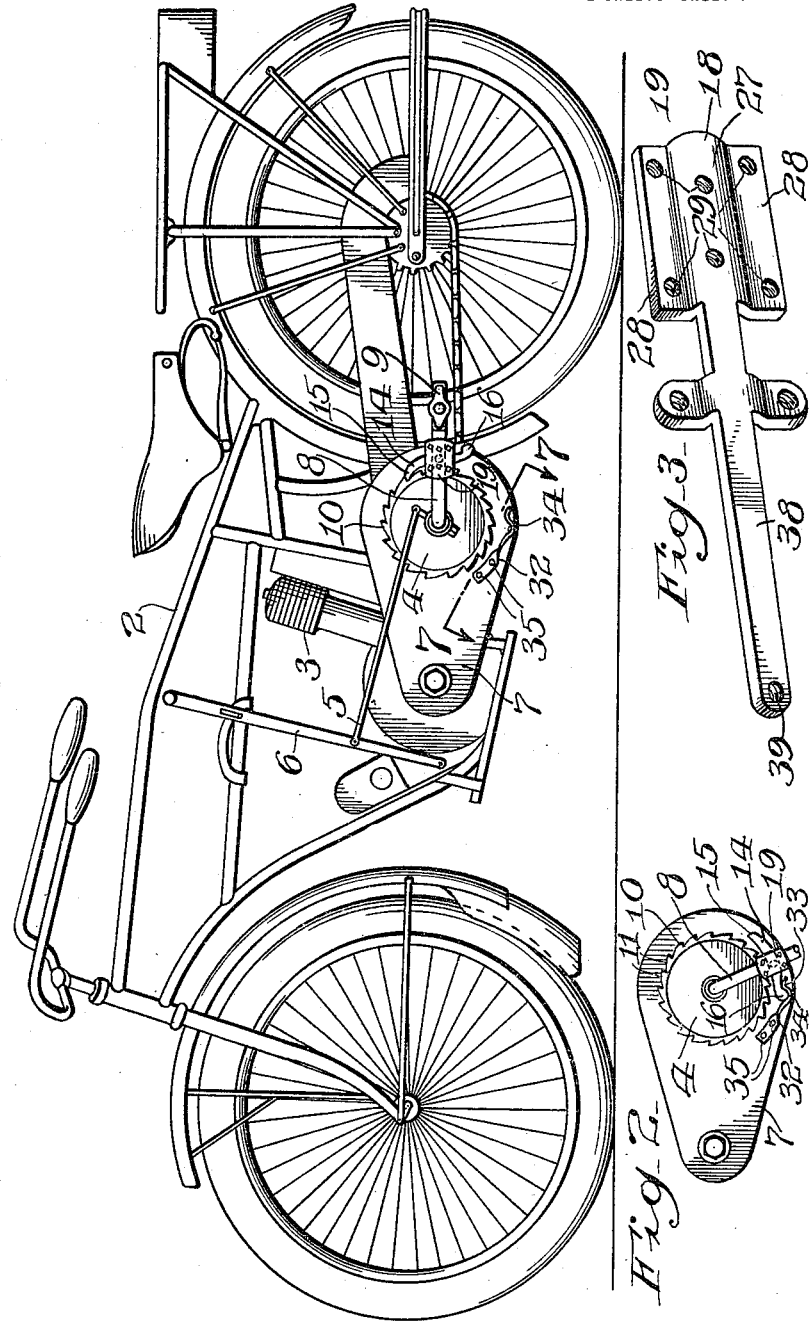
Witness
Thro. Rosemann
Inventor
Earl H. Hahn,
By W. W. Williamson
Attorney

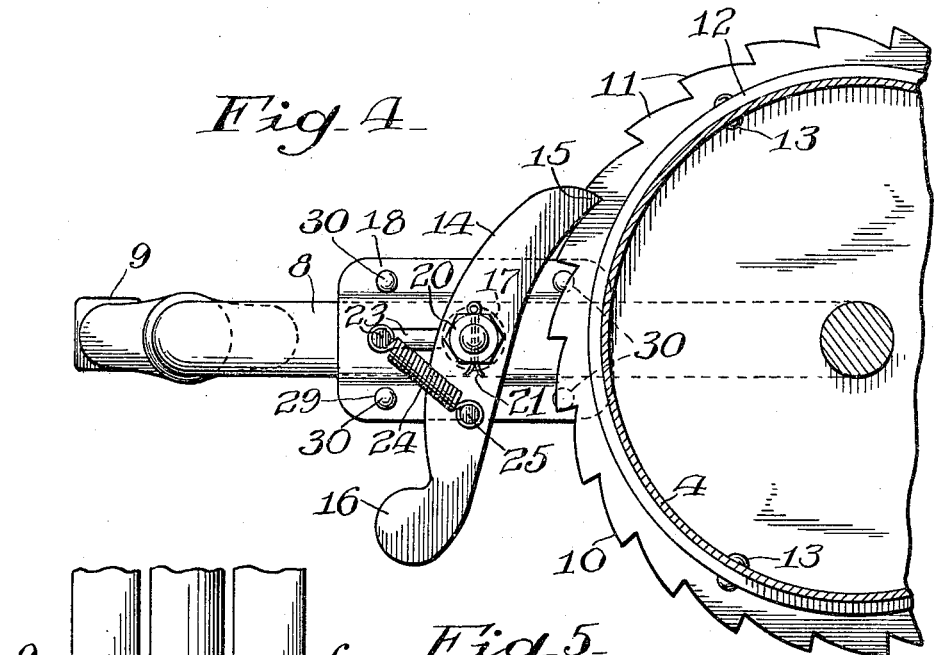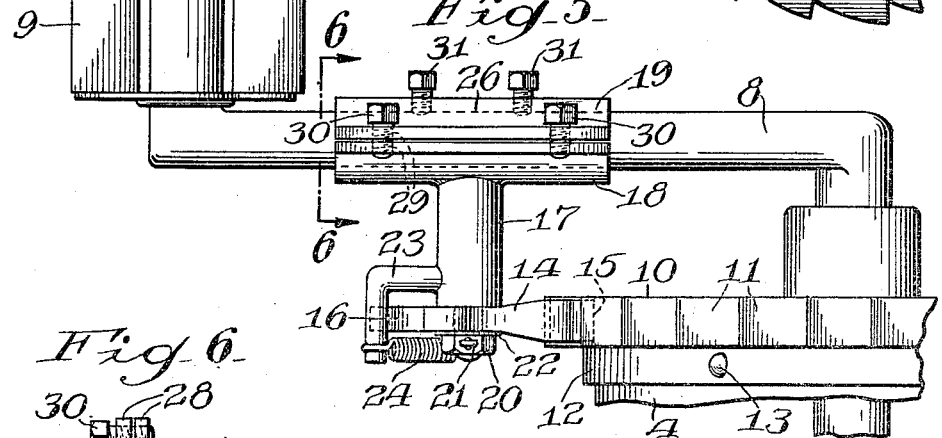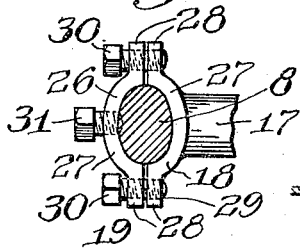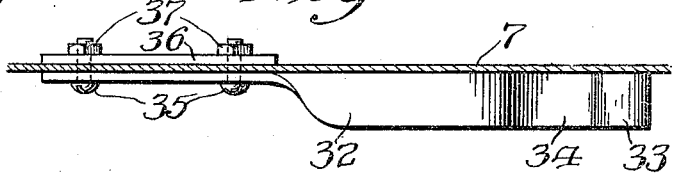

UNITED STATES PATENT OFFICE.

EARL H. HAHN, OF MALLARD, IOWA.

MOTOR-CYCLE STARTER.

1,272,947.  Specification of Letters Patent.  Patented July 16, 1918.

Application filed November 3, 1916. Serial No. 129,345.

*To all whom it may concern:*

Be it known that I, EARL H. HAHN, a citizen of the United States, residing at Mallard, Palo Alto county, Iowa, have invented new and useful Improvements in Motor-Cycle Starters, of which the following is a specification.

My invention relates to new and useful improvements in motorcycle starters, and has for its object to provide an exceedingly simple and effective device of this character, which may be readily and quickly applied to motorcycles of different constructions and more particularly any motorcycle provided with a counter-shaft clutch or a rear wheel clutch, which is started by the use of the pedals.

Another object of the invention is to provide a motorcycle starter which will be simple in construction having very few parts, which will be relatively inexpensive in the cost of manufacture, which will be strong and durable, more reliable than most starters in use at the present time because there are no valves to open or close, and which will be much more simple in operation.

A further object of the invention is to provide a motorcycle starter whereby the motor may be given its initial start while both of the motorcycle wheels are on the ground, and which will also permit the use of the pedals for propelling the motorcycle should any of the parts become broken, disarranged, whereby the motor could not be used as the propelling power.

A still further object of the invention is to provide a device of this character, wherein all gears and the neutral counter-shaft are eliminated and which will require less effort on the part of the operator in starting the motor.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this specification, in which—

Figure 1, is a side elevation of a motorcycle showing my improvement applied thereto with the dog or pawl in engagement with the ratchet wheel ready for use.

Fig. 2, is a fragmentary side elevation of the motorcycle showing the pawl held out of engagement with the ratchet wheel.

Fig. 3, is an enlarged perspective view of one-half of the pawl carrying clamp, showing a construction which may be utilized for starting the motor from the same side of the vehicle on which the starter is mounted.

Fig. 4, is an enlarged fragmentary sectional view, looking outward, of the clutch showing my invention applied thereto.

Fig. 5, is a plan view thereof.

Fig. 6, is a fragmentary section at the line 6—6 of Fig. 5; and

Fig. 7, is a section at the line 7—7 of Fig. 1.

In carrying out my invention as here embodied 2 represents a motorcycle of any desired construction or well known make, provided with a motor or engine 3, a clutch 4 connected by a clutch rod 5 with the clutch lever 6, a chain guard 7 covering the chain connecting the clutch and engine shaft, and a crank hanger 8 carrying the pedals 9.

On the outer member or casing of the clutch 4 is mounted a ratchet wheel or ring 10 secured in position in any suitable and well known manner. This ratchet wheel preferably consists of the serrated rim 11 provided with an integral annular flange 12 projecting therefrom at right angles thereto and provided with suitable holes or perforations whereby any desirable fastening means may be used to secure the ratchet wheel to the clutch such as screws or their equivalent, said fastening means as here represented being rivets 13.

The ratchet wheel or ring is adapted to be engaged by a dog or pawl 14, the nose 15 of which is slightly curved inward so as to more readily engage the serrations or teeth, while the opposite end of said dog is provided with a knob or hemispherical projection 16 for engagement with a pin catch to hold the nose of said dog out of engagement with the ratchet wheel as will be hereinafter described.

The pawl or dog 14 is pivotally mounted intermediate its ends upon the reduced end of a suitable trunnion or short shaft 17 formed integral with one or the inner member 18 of the clamp 19. The dog is held in place by means of a bur or nut 20 threaded on the outer end of the trunnion 17 held in place against accidental displacement by means of a cotter-pin 21, a washer 22 being interposed between said nut and the dog. With the trunnion 17 is formed an integral right angled extension 23 the outer portion of which is parallel with the trunnion 17, and to this extension or spring contact is secured one end of the helical spring 24, the opposite end of said spring being secured to a lug 25 formed integral with the dog. The lug 25 is on that side of the pivot point of the dog opposite the nose 15, so that the action of said spring normally forces the nose 15 into engagement with the ratchet wheel.

The clamp 19 consists of two members 18 and 26 identical in cross section, and each comprises a hanger encircling portion or body 27 with opposite projecting flanges 28 provided with suitable openings 29 for the reception of screws or bolts 30 or their equivalent. The clamp 19 is adapted to surround the crank hanger 8, and is held securely against accidental displacement by suitable set screws 31 screwed into one of the members of the clamp as the outside member; the inner ends of said set screws engaging the crank hanger, which if found desirable may be spotted after the proper position for the clamp has been located.

In order that the ratchet dog or pawl 14 may be held out of engagement with the ratchet wheel when the starter is not in use, I provide a spring catch 32 formed of suitable resilient material having a cam surface 33 at its outer or free end and provided to the rear of the cam surface with a socket or cavity 34 for the reception of the knob or hemispherical projection 16 of the dog as plainly shown in Fig. 2. This spring catch is secured in any suitable manner to the chain guard 7 and is positioned to suit the operator of the motorcycle, so that the pedals may be held in any desired position.

As here shown, this spring catch is secured to the chain guard 7 and held in position by suitable bolts 35 which pass through a portion of the catch through the chain guard and through a backing plate or strip 36, said bolts having nuts 37 threaded thereon for holding the parts together.

In practice when it is desired to start the motor or engine the operator applies the desired pressure to the pedal on the side of the motorcycle opposite that on which the starter is mounted, starters generally being mounted upon the left-hand side, which will cause the ratchet dog or pawl 14 to be disengaged from the spring catch 32 at which time the spring 24 will cause the nose of said ratchet dog to engage the ratchet wheel. Then by forcing down on the right hand pedal, the ratchet wheel 10 will be caused to revolve, which will transmit motion through the clutch and the chain connected therewith to the shaft of the engine, thereby giving said engine its initial start. When the engine is being started, the clutch lever 6 is thrown forward, so as to unclutch the rear wheel from the engine. If the motor is not started on the first downward throw of the right-hand pedal, said pedal is returned to its normal position, the ratchet dog rides over the serrations of the ratchet wheel and said pedal given another downward movement. As soon as the motor or engine has been started, the left-hand pedal is forced downward until the knob or projection 16 engages the cam surface 33 of the spring catch 32. Then with the necessary additional pressure upon said pedal, said knob or projection will slide into the socket 34 causing the nose 15 of the ratchet dog to be disengaged from the ratchet wheel.

If for any reason, such as an impaired engine, the operator desires to use the pedals for propelling the motorcycle it is only necessary to set the clutch in the proper position, and then remove the clutch rod 5 and the spring catch 32, at which time the pedals may be revolved so that power may be transmitted to the rear wheel of the motorcycle, after the manner of a bicycle.

Where the operator of a motorcycle does not care for a pedal on each side and desires to start the motor from the left hand side, I form an extension 38 with the outside clamp member 18, said extension being of any desired length, so as to project the desired distance beyond the bearing point of the crank hanger in the direction opposite the part carrying the pedal and the outer end of this extension is provided with a threaded hole 39, whereby a pedal may be attached thereto.

Of course I do not wish to be limited to the exact details here shown, as these may be varied within the limits of the appended claims without departing from the spirit of my invention.

One of these variations or a modification in the construction of my device would be the making of the trunnion 17 integral with the crank hanger 8, so that the sections 18 and 19 of the clamp with its bolts and set screws would be eliminated and where the pedal on the left hand side is used for starting an extension could be formed with the crank hanger on that side, and the bearing portion which pass through the clutch could be much shorter than those used at the present time.

Having thus fully described my invention, what I claim as new and useful, is—

1. The combination with a member to be rotated, a crank hanger carrying pedals and a guard, of a ratchet wheel secured to the member; a clamp adapted to be secured to the crank hanger, a trunnion or short shaft formed integral therewith, an integral right angled extension formed with said trunnion, a pawl or dog pivotally mounted on said trunnion, having a nose at one end for engaging the ratchet wheel and provided at the other end with a knob or projection, a lug formed with the dog, means mounted on the trunnion for preventing the displacement of the dog, a spring connected with the right angled extension and lug for normally forcing the nose of the dog into engagement with the ratchet wheel, and a spring catch secured to the guard, said catch having a cam surface at its free end and a socket to the rear thereof, the knob or projection on the dog adapted to register with said socket for holding the dog out of engagement with the ratchet wheel.

2. In a motorcycle starter, the combination with a clutch and crank hanger, of a ratchet wheel on said clutch, a clamp comprising two members adapted to be secured to the crank hanger, an extension formed with the outer member adapted to project in the opposite direction to the hanger, said extension having a threaded hole therein for the reception of a pedal, a trunnion formed with the inner member, a dog mounted on said trunnion adapted to engage the ratchet wheel, a spring for normally forcing said dog into engagement with said ratchet wheel, and means for holding the said dog out of engagement with the ratchet wheel.

3. The combination with a member to be rotated of a ratchet wheel secured to said member, a crank hanger, a clamp consisting of two coöperating members detachably secured to the crank hanger, a trunnion formed integral with one of the members of said clamp, a pawl or dog journaled on said trunnion and adapted to engage the ratchet wheel, a right angled extension formed integral with the trunnion with its outer portion parallel with said trunnion, a spring attached to said extension and to the dog for normally forcing the nose of said dog toward the ratchet wheel and means located in the path of travel of the dog in one direction, whereby the nose of said dog may be held out of engagement with the ratchet wheel.

In testimony whereof, I have hereunto affixed my signature.

EARL H. HAHN.

Copies of this patent may be obtained for five cents each, by addressing the "Commissioner of Patents, Washington, D. C."